E. Doen,
Door Bolt.
Nº 20,940.   Patented July 20, 1858.
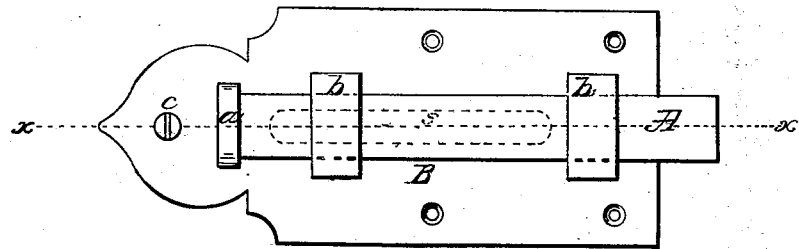
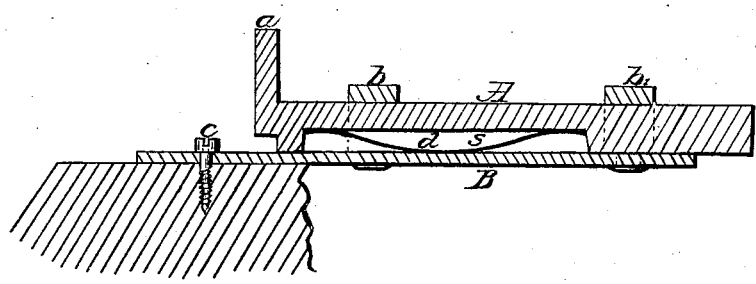
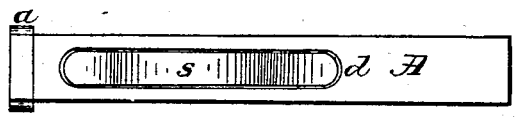

UNITED STATES PATENT OFFICE.

E. DOEN, OF NEW BRITAIN, CONNECTICUT.

SPRING-BOLT.

Specification of Letters Patent No. 20,940, dated July 20, 1858.

*To all whom it may concern:*

Be it known that I, EDWARD DOEN, of New Britain, in the county of Hartford and State of Connecticut, have invented a certain new and useful Improvement in Flat Spring-Bolts, of which the following is a full, clear, and exact description, reference being had to the accompanying drawing, which forms part of this specification, and in which—

Figure 1 represents a face view of the bolt with the plate in or on which it slides; Fig. 2 a longitudinal section taken as indicated by the line *x x* in Fig. 1; and Fig. 3 an interior face view of the bolt detached.

In speaking of a "flat spring bolt," it is here designed should be implied a sliding bolt working in and along or through one or more suitable clips attached to or forming part of the bed or bearing plate of the bolt, and between which and the bolt, spring pressure is brought to bear so as to produce one sided friction on the bolt, to provide against either too great looseness, which is specially objectionable where the bolt shoots upward, or twisting and hard or irregular action in the play of the bolt. Such bolts are common and well known, and are applicable to a variety of both in and out door opening and closing contrivances, to secure them. The said bolt is, in fact, one of such general utility as to form a prominent and distinct article of manufacture, the smallest improvement on which is of great importance. Like other sliding bolts, it is designed as a positive lock, by the bolt proper shooting into a catch or recess arranged to receive it, said catch of course being distinct from the spring borne bolt, which is a thing complete in itself, and which, if attached to a door, may lock over a rib in the door casing or in a notch of said casing. The spring arrangement in such bolts is of course distinct from a spring pull or thrust in the line of action of the bolt, and the advantage of such an arrangement over or as compared with a sliding bolt having no such smooth or easy, regular and permanent, guiding and staying friction, will be readily seen by removing the spring from the bolt in the present improvement. Yet, there are circumstances attending the use of a sliding lock bolt when it may be preferable to dispense, at times, with the spring, to convert the contrivance into an easy, self operating drop bolt (say), and this conversion, my improvement greatly facilitates, but such is only one of many advantages possessed by my invention, or that it may possess if required.

Like other bolts of the class to which my improvement is confined, the article is made up of three parts or portions, to wit: the bolt carrying and guiding plate, bolt proper, and spring acting on the bolt in the manner previous described.

In the accompanying drawing, the sliding bolt (A) is shown in connection with an ordinary guiding and carrying arrangement, consisting of a surface plate (B), which is designed to be fastened by screws or nails to the door (say), and which has straps or staples (*b*, *b*¹) that project from it and form, together with the surface plate, holding clips and guiding bearings to the bolt. One long guiding and holding clip might take the place of two to the bolt, or the bolt be otherwise equivalently held and directed.

Supposing the bolt (A) to have a thumb piece (*a*) formed at its back end, the one clip (*b*) may also act as a stop to the bolt in its advance movement, by said thumb piece striking the clip, and a removable screw stop (*c*) may serve to arrest the bolt in its back movement. said screw stop being arranged to pass through the surface plate above or in rear of the play of the bolt, and serving, by its screw shank, to hold the surface plate to its place, as well as, by its projecting head, to act as a stop to the bolt. But such stopping provision may be varied and, in some cases, altogether dispensed with. The plate carrying the bolt might be cut, bent, or formed to establish the stop in both directions, or in one direction. The bolt might have a projection attached to it playing between the holding straps (*b b*¹) and forming a stop by striking the straps; or, the bolt itself might be made what is called "necked" or turned up at either end to be self stopping.

I now come to my peculiar arrangement of the spring, with the guided bolt, and carrying or guiding plate or surface to the bolt for the spring to act against. The spring (*s*), it will be observed, is here embodied in the bolt (A), intermediate of its length, and preferably, perhaps, where the bolt is a short one, occupying the greater portion of the length of the bolt, back of the end part which locks with the catch.

Where the bolt is a long one, the spring may occupy a relatively lesser portion, or two or more springs, one in advance of the other may be used. Said spring is made of any suitable material, and of wagon-spring form of build, semi-elliptic or curved.

The bolt (A) is slotted or formed with a recess (d) to receive the spring within the bolt. This recess (d) may be easily made in the manufacture of the bolt without much, if any, additional cost or labor, and, though such is not its function proper, it serves to lighten the bolt. Said recess (d) should be made large enough to admit of the free action of the spring (s) which is seated loosely therein, the two ends of said spring resting against the back of the recess (d), while the center of the spring presses on the surface or bearing plate (B). Instead of the cavity (d) being on the inner side of the bolt, it might be on the outer side and the center of the spring press against a suitable outer covering, as, for instance, against the inner face of a long guiding strap or clip before referred to. Or, the cavity and spring might be similarly arranged in the edge of the bolt, and the spring act against a projecting edge ledge.

Having already referred to other spring-borne sliding lock bolts, and the action and use of the spring in such arrangements, it is unnecessary for me here to describe the general effect or operation of the present arrangement or other than to show some of the points of difference and advantages, separate or combined, over other well known constructions of bolt of the character specified, incidental or belonging to my arrangement.

The spring (s) is carried back and forth by the bolt (A) without being attached thereto. Its being thus carried back and forth and arranged intermediate of the ends of the bolt gives a uniform or central, as it were, thrust on the bolt freeing it from much or any dip or twist, throughout the stroke of the bolt—long or short; while the spring being loose, it may readily be taken out for repair, or substitution, or to convert the spring borne bolt into a free drop one. The spring has two bearings for support at either end, and being a loose fitting, may be left or made whole or entire, and thereby stronger and perfectly unconstrained. The force of the spring, or force on it, is at or against its center, thus equalizing the strain and pressure, and calling forth the equal elasticity of all parts of the spring. The spring being completely covered by the bolt and surface plate against which it presses, it is protected from all outside interference or injury, and the arrangement is such that the spring face of the bolt may work close up to the surface plate on which the spring acts. This arrangement therefore importantly differs from other spring borne bolts having the spring secured by a bolt or rivet to the carrying plate to act against the bolt on the latter moving over it, in some, at least, of which, the spring has but one bearing for support and that materially weakened by the hole in the spring for the purpose of securing the same and holding it (the spring) in place; which objection applies, with equal force, to arrangements in which a spring has been secured at one of the ends to the sliding bolt and carried as a drag along with the bolt, said spring pressing at its other end on the surface plate, which arrangement takes a much heavier spring to sustain the bolt. In such arrangements also, the resistance is placed against the end of the spring, so that it is impossible to equalize the strain; likewise, the heft of the strain on the spring comes at its weakest point, that is, where the rivet passes through the spring, at which point breakage generally happens; and the spring is more or less exposed and liable to be broken for want of protection, and, if made of steel and exposed to the weather, its temper and elasticity are injuriously affected. Compare these defects with the advantages before named for my arrangement of an entire and strong but light and lively, loose or detachable spring having equalization of strain, or thereabout, and unconstrained play in the body of the bolt by which it is wholly protected or may be so, and the practical importance of my improved construction of bolt, of the character specified, will be readily seen.

What I claim as new and useful herein, and desire to secure by Letters Patent, is:

The combination, with the guided sliding bolt (A) and surface plate (B), of a loose or freely arranged spring (s) let into the body of the bolt, and protected or incased thereby, for operation on, at points some distance apart, and with the bolt, and against the surface plate, substantially as described, for the purpose set forth.

In testimony whereof, I have hereunto subscribed my name.

EDWARD DOEN.

Witnesses:
W. H. RILEY,
MARCELLUS CLARK.